UNITED STATES PATENT OFFICE.

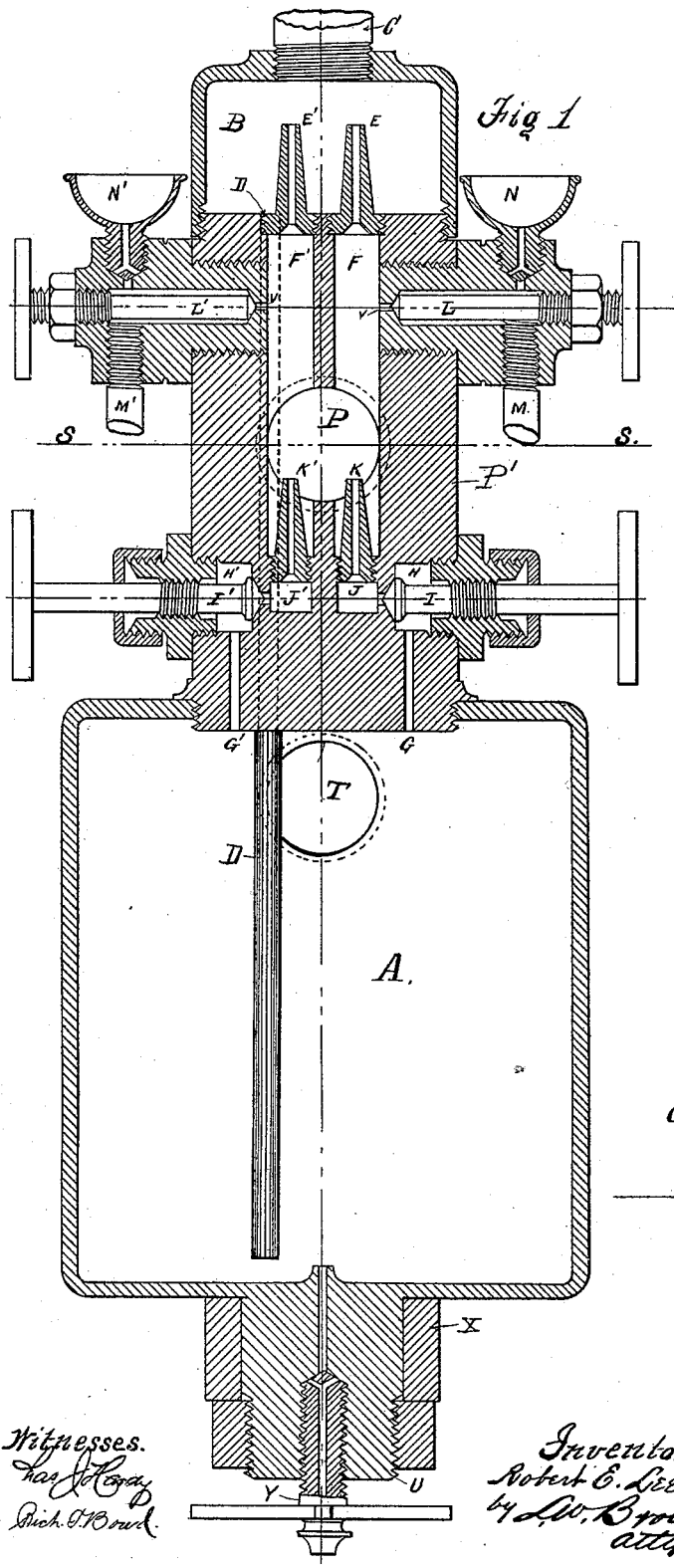

ROBERT E. LEE, OF NEW ORLEANS, LOUISIANA.

LUBRICATOR.

SPECIFICATION forming part of Letters Patent No. 391,803, dated October 30, 1888.

Application filed June 28, 1888. Serial No. 278,490. (No model.)

*To all whom it may concern:*

Be it known that I, ROBERT E. LEE, of the city of New Orleans, parish of Orleans, State of Louisiana, have invented new and useful Improvements in Lubricators; and I declare the following to be a full, clear, and concise description of the same, such as will enable others skilled in the art to which it pertains to make and use it, reference being had to the accompanying drawings, forming part of this specification.

My invention consists of the combination of devices and appliances hereinafter specified, and more particularly pointed out in the claims.

Figure 1 is a longitudinal central section of a lubricator embodying my invention. Fig. 2 is a horizontal section on plane S S, Fig. 1, showing construction of sight-glasses, &c.

My invention relates, chiefly, to that class of lubricators designed more especially for use upon locomotives, and in this connection I would have it understood that the lubricator may be single—that is to say, provided with a single oil-exit orifice—as is required for single-cylinder engines, or it may be made double, as shown—that is to say, provided with two oil-exit orifices—as is necessary for a double-cylinder motor or a locomotive—or it may be provided with three or more openings or orifices for oil exit, to enable the one cup to satisfactorily lubricate both cylinders of a locomotive, as also the cylinder of air-pumps or other machinery requiring several distinct lubricating connections.

My invention consists, essentially, in providing each oil-conduit with an equalizing-conduit, said conduits being embraced entirely within the body of the lubricator, whereby steam from the boiler is at all times permitted to discharge into the oil-exit conduit.

It further consists of but one sight-glass for any number of oil-exit orifices, and this sight-glass is thoroughly protected from accident by being placed within the body of the lubricator, which is an advantageous feature.

To describe the construction of my invention, A represents the oil-reservoir; B, its condenser; C, a steam-pipe leading to the condenser.

D represents a conduit for leading the water of condensation from the condenser B to the bottom of the oil-reservoir A.

E E' represent steam-conduits leading from condenser B to the chambers F F'.

G G' represent oil-conduits connecting the oil-reservoir A with the valve-chambers H H'.

I I' are oil-valves to regulate the flow of oil from valve-chambers H H' into chambers J J', and K K' are oil-conduits to allow the oil to pass from the chambers J J' into the sight-chamber P and chambers F F'.

L L' represent valves to regulate the admission of oil and steam from the chambers F F' through the oil-exit orifices V V' to the pipes M M', which pipes lead to and connect with the cylinders or parts to be lubricated.

N N' represent oil cups and valves shaped to receive oil and to be used in case of accident to the lubricator.

P represents the orifice for the sight-glasses, there being but one sight-glass for any number of oil-exit orifices. This orifice P is drilled through the wall of the hollow post P', as shown, and is counterbored to receive the glasses R R', one on each side, so that a light can be reflected on the opposite glass and the working of lubricator observed at night without a lantern. These glasses R R' are made steam-tight by the gaskets W W', secured by the screw-nuts O O'.

T represents a sight placed in the upper part of the reservoir A, to enable the level of the oil when near exhausted to be ascertained.

U represents a projection on bottom of reservoir, by which same is secured to bracket X of engine.

Y represents the valve for draining reservoir A.

The operation of the device will now be readily understood: Steam entering through the pipes C condenses within the condenser B, and the condensed water is fed down the conduit D into the oil-reservoir A, which displaces the oil in the reservoir A and causes same to pass through the conduits G G' into the valve-chamber H H'; and on opening the valves I I' the oil passes into the chambers J J' and through the conduits K K' into the sight-chamber P and chambers F F' to the opening V V', where it meets the steam passing from condenser B through the conduits E E', and is atomized and driven by it through the pipes M M' to the parts to be lubricated.

In case of accident to the lubricator or while a glass is being replaced lubrication is effected by means of the oil-cups N N'.

A lubricator made as above described possesses all the advantages of an equalizing-lubricator, and at the same time is most simple and cheap in construction and obviates any glass-tube sight-feeds, which are liable to be broken on account of their exposed condition. Further, one sight-glass, as above, answers for any number of oil-exit orifices.

It is readily understood that all equalizing-conduits, as also the sight-glass, are contained wholly within the body of the lubricator.

I would have it understood that it is not absolutely necessary to construct the lubricator with the oil-cups N N'. The working of the lubricator being entirely independent of same, its service is required only in an emergency, and as my lubricator has no projecting parts liable to accident the emergency causing the use of the oil-cups may never happen.

What I claim as new, and desire to secure by Letters Patent, is—

1. In a lubricator, the combination of the oil-reservoir A, provided with projection U, drain-valve Y, and sight-glass T, the steam or condensed-water conduit D, connecting the reservoir A and condenser B, the oil-conduits G G', regulating oil-valves I I', oil-conduits K K', sight-glasses R R' in orifice P of hollow post P', and chambers F F', with the condenser B, receiving steam through pipes C and connected by conduit D with the oil-reservoir A and steam-conduits E E', oil and steam valves L L' for openings V V', pipes M M', and oil-cups N N', all substantially as described and shown.

2. In a lubricator, the combination of the oil-reservoir A, oil-governing valves I I', the hollow post P', having orifice P, sight-glasses R R', condenser B, and regulating-valves L L', with equalizing-conduits contained within the lubricator, as shown and described.

3. In a lubricator, the combination of the oil-reservoir A, condenser B, hollow post P', valves I I' and L L', and equalizing-conduits contained within the condenser, with the sight-orifice P, sight-glasses R R', said glasses being secured by gaskets W W' and by nuts O O', all substantially as set forth.

ROBERT E. LEE.

Witnesses:
CHAS. J. HARDY,
RICH. T. BOND.